United States Patent
Maskalik et al.

(10) Patent No.: US 10,505,806 B2
(45) Date of Patent: Dec. 10, 2019

(54) LEARNING AND DEPLOYING DATACENTER LANDSCAPES

(71) Applicant: VMware, Inc., Palo Alto, CA (US)

(72) Inventors: Serge Maskalik, Los Gatos, CA (US); Sachin Thakkar, San Jose, CA (US); Gabriel Rosas, Dallas, TX (US); Debashis Basak, San Jose, CA (US); Allwyn Sequeira, Saratoga, CA (US)

(73) Assignee: VMware, Inc., Palo Alto, CA (US)

( * ) Notice: Subject to any disclaimer, the term of this patent is extended or adjusted under 35 U.S.C. 154(b) by 169 days.

(21) Appl. No.: 15/690,249

(22) Filed: Aug. 29, 2017

(65) Prior Publication Data

US 2018/0062929 A1     Mar. 1, 2018

Related U.S. Application Data

(60) Provisional application No. 62/381,001, filed on Aug. 29, 2016.

(51) Int. Cl.
    *G06F 15/177*     (2006.01)
    *H04L 12/24*     (2006.01)

(52) U.S. Cl.
    CPC ...... *H04L 41/0886* (2013.01); *H04L 41/0806* (2013.01); *H04L 41/0813* (2013.01); *H04L 41/0823* (2013.01); *H04L 41/0843* (2013.01)

(58) Field of Classification Search
    CPC ............ H04L 41/0886; H04L 41/0806; H04L 41/0813; H04L 41/0823; H04L 41/0843

USPC ......................................................... 709/220
See application file for complete search history.

(56) References Cited

U.S. PATENT DOCUMENTS

| | | | | |
|---|---|---|---|---|
| 2005/0265356 | A1* | 12/2005 | Kawarai | H04L 12/4641 370/395.53 |
| 2016/0191623 | A1* | 6/2016 | Vasudevan | G06F 16/951 709/201 |
| 2017/0024260 | A1* | 1/2017 | Chandrasekaran | G06F 9/45558 |

* cited by examiner

*Primary Examiner* — Wing F Chan
*Assistant Examiner* — Joseph R Maniwang
(74) *Attorney, Agent, or Firm* — Patterson + Sheridan, LLP (57) ABSTRACT

Techniques disclosed herein permit logical topologies of datacenters to be automatically learned and re-created in the cloud. In one embodiment, a datacenter landscape is determined based on numbers of hops from nodes in a datacenter to a wide area network (WAN)-facing node. Such a datacenter landscape may then be re-created in the cloud. In another embodiment, virtual appliances are deployed using templates with user-tunable parameters. What would have been set up manually in a physical datacenter, such as connecting a new router to other devices, is then simplified to adjusting parameters of the template to specify, e.g., that the router is a routed hop rather than a bump in the wire, with the router then being automatically deployed in the specified manner.

17 Claims, 4 Drawing Sheets

LEARNING AND DEPLOYING DATACENTER LANDSCAPES

CROSS-REFERENCE TO RELATED APPLICATIONS

This application claims the benefit of U.S. Provisional Patent Application No. 62/381,001, filed Aug. 29, 2016, the entire contents of which are incorporated by reference herein.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

With an increasing trend in migrating data centers to cloud platforms, a hybrid model has been developed that combines public cloud services and traditional on-premise data center computing resources. Such hybrid cloud computing systems permit workloads, such as virtual machines, to be rapidly moved from the data center to the cloud.

SUMMARY

One embodiment disclosed herein provides a computer-implemented method of deploying a datacenter landscape in a first computing system. The method generally includes receiving a detected number of hops from each of a plurality of leaf nodes in a second computing system to a wide area network (WAN) facing node in the second computing system. The method further includes determining the datacenter landscape based on at least the detected numbers of hops. In addition, the method includes deploying the determined datacenter landscape in the first computing instance.

Further embodiments of the present invention include computer systems configured to carry out the above methods, and non-transitory computer-readable storage media comprising instructions that cause the computer system to carry out the above methods.

DETAILED DESCRIPTION

Embodiments disclosed herein permit logical topologies of datacenters to be automatically learned and re-created in the cloud. In one embodiment, a datacenter landscape is determined based on numbers of hops from nodes in a datacenter to a wide area network (WAN) facing node. Such a datacenter landscape may then be re-created in the cloud. In another embodiment, virtual appliances are deployed using templates with user-tunable parameters. What would have been set up manually in a physical datacenter, such as connecting a new router to other devices, is then simplified to adjusting parameters of the template to specify, e.g., that the router is a routed hop rather than a bump in the wire, with the router then being automatically deployed in the specified manner.

System Overview

Figure 1:
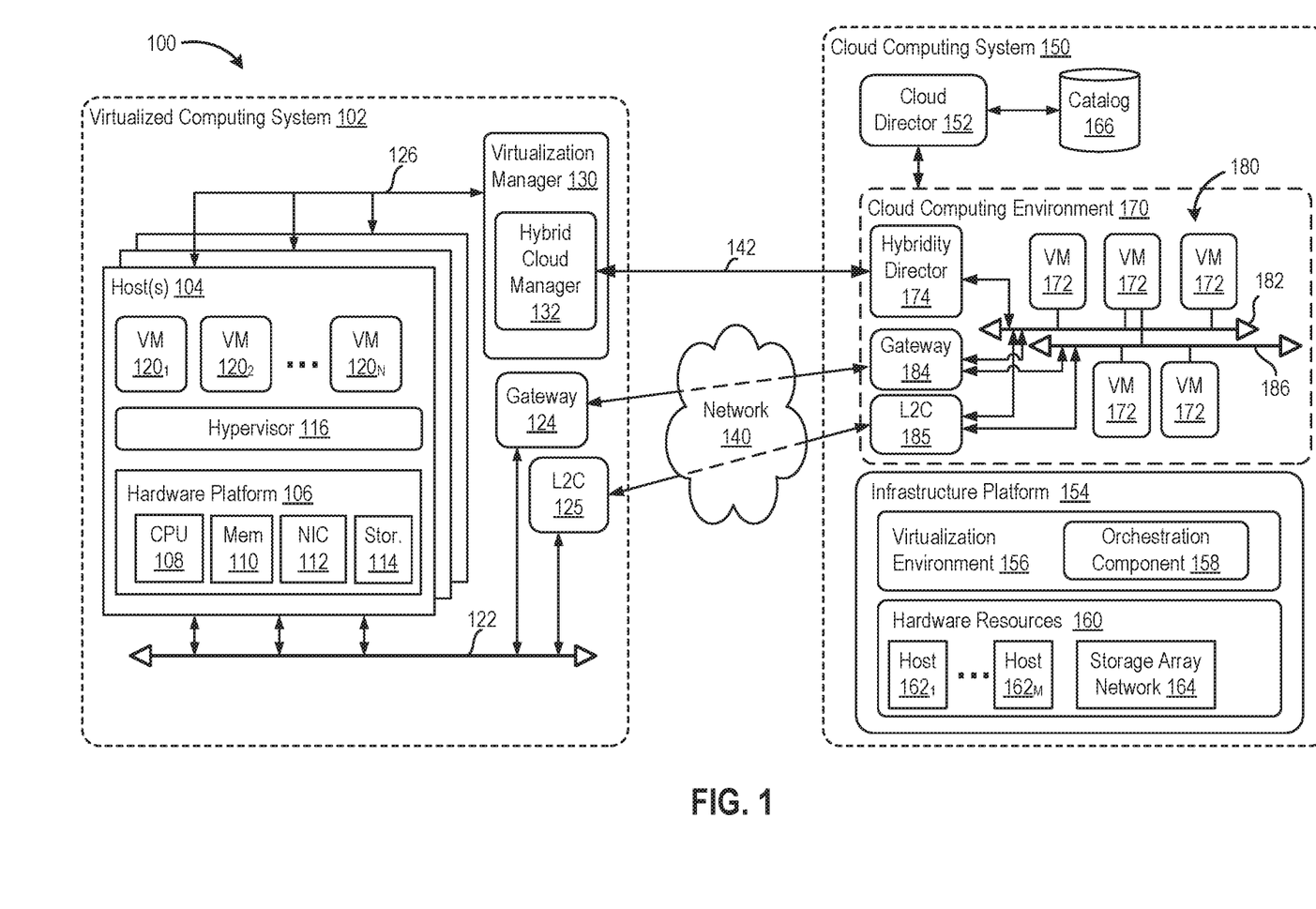
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud diagram computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service providing cloud services to various organizations within the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 1125 within virtualized computing system 102.

Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere® solution made commercially available from VMware, Inc. Hypervisor 116 may run on top of the operating system of host 104 or directly on hardware components of host 104. In addition, hypervisor 116 may provide a virtual switch (not shown), which is a software-based switch acting as a layer 2 (L2) forwarding engine and capable of performing VLAN tagging, stripping, filtering, L2 security, checksum, segmentation offload units, and other tasks typically performed by physical switches. The virtual switch may include uplink ports which connect to physical network adapters, as well as VM ports which connect to virtual network adapters and provide connections for hypervisor 116 and VMs. In one embodiment, the virtual switch may be part of a distributed virtual switch that is an abstraction of a switch across multiple host servers and that permits virtual switches on the multiple host servers to be managed as if ports of those virtual switches belonged to a single switch, the distributed virtual switch.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter Server® product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104.

In one or more embodiments, cloud computing system 150 is configured to dynamically provide an enterprise (or users of an enterprise) with one or more virtual data centers 170 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as a multi-tenant cloud service with logically isolated virtualized computing resources on a shared physical infrastructure. It is recognized that cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and virtual machine packages that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual machine) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is a WAN facing device providing services such as intelligent routing, traffic steering, WAN optimization, encryption, etc. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link between virtualized computing system 102 and cloud computing system 150. Layer 2 concentrators (L2C) 125 and 185 are parallel to gateways 124 and 184 and configured to provide a "stretched" L2 network that spans virtualized computing system 102 and cloud computing system 150. Stretched network 145 may be separate from network 140 used by gateways 124 and 184 so that, e.g., VM migration traffic over network 140 does not create latency in stretched network 145.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity directory (e.g., executing as a virtual machine) may communicate with hybrid cloud manager 132 using Internet-based traffic via a VPN tunnel established between gateways 124 and 184, or alternatively, using direct connect 142.

Deploying Learned Datacenter Landscapes

Figure 2:
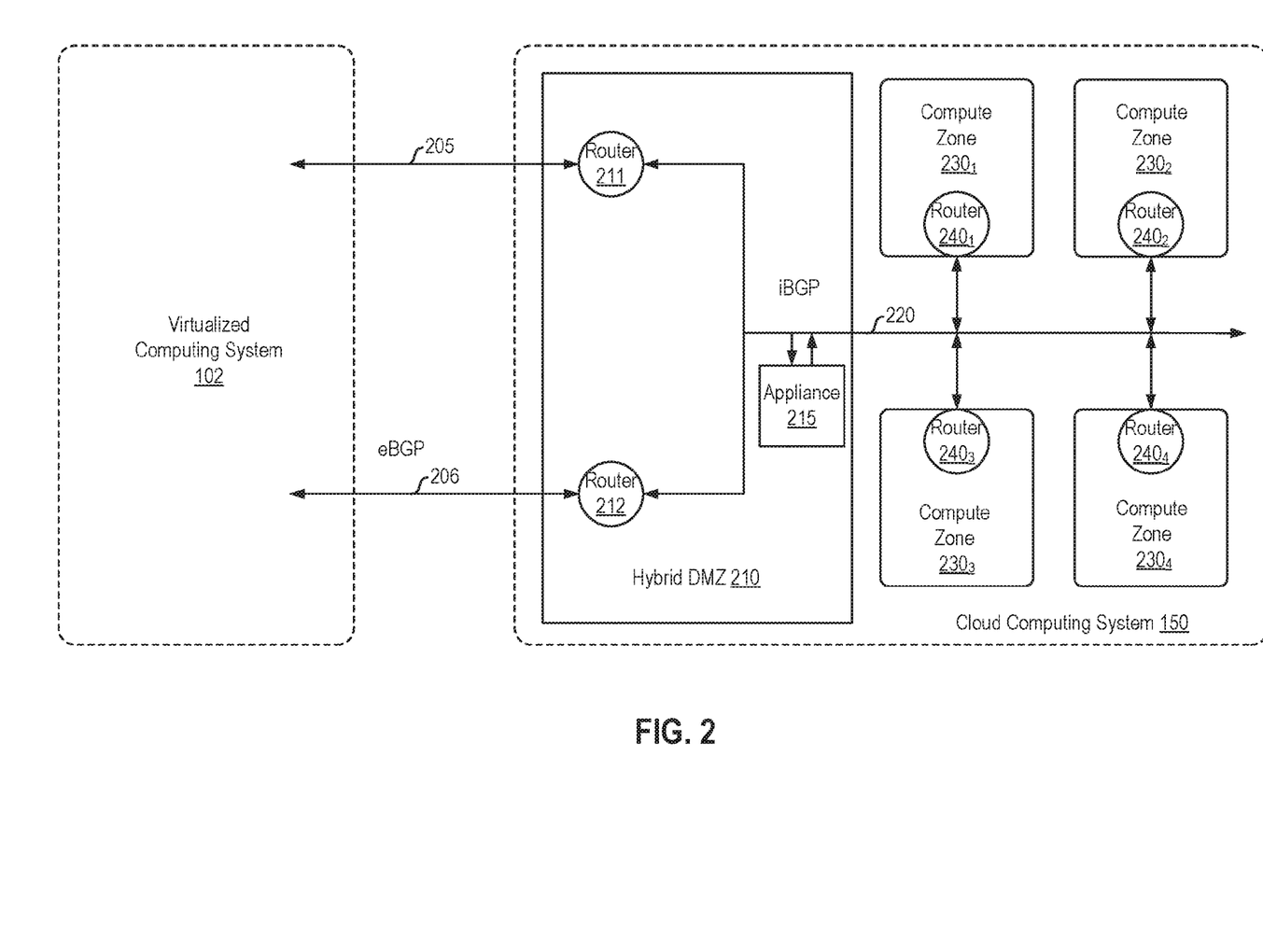
FIG. 2 illustrates a hybrid demilitarized zone in a hybrid cloud computing system, according to an embodiment.

FIG. 2 illustrates a hybrid DMZ in a hybrid cloud computing system, according to an embodiment. As shown, hybrid DMZ 210 is a front-end security endpoint in cloud computing system 150, with compute instances and tiers of networks behind hybrid DMZ 210. Such a network topology mimics the typical topology of enterprise datacenters, and one embodiment allows datacenters on enterprises' premises to be replicated, from a security and connectivity perspective, to the cloud, as described in greater detail below.

Illustratively, two direct connect (DC) lines 205 and 206 connect virtualized computing system 102 to cloud computing system 150. For example, external border gateway protocol (eBGP) may be used to transport traffic over DC lines 205, while internal border gateway protocol (iBGP) may be used to transport traffic inside cloud computing system 150. Hybrid DMZ 210 itself includes virtual routers 211 and 212 for each of the DC lines 205 and 206. Illustratively, hybrid DMZ 210 communicates with compute zones $230_{1-4}$ via a transit network 220. Transit networks are any local area network (LAN) facing internal zones, as opposed to the wide area network (WAN) or a leaf. Each of compute node pools $230_{1-4}$ includes a respective router $240_{1-4}$ that connects to transit network 220. Although one transit network 220 is shown, there may generally be any number of transit networks that perform various different functions, such as one transit network for backups, another transit network for VM traffic, etc.

It should be understood that the different pools $230_{1-4}$ of computes nodes may generally have different security policies, and hybrid DMZ 210 provides an additional, centralized security policy. In one embodiment, central administrator(s) are able to modify security policies in hybrid DMZ 210 or compute zones, while compute zone administrators can only control what is in their respective compute zones. For example, compute node pools $230_{1-4}$ may belong to different business units with different security needs, and hybrid DMZ 210 may be set up by a central information technology (IT) department for overall control. The appropriate routing relationships need to be set up so that, e.g., workloads in one compute node pool that are on one network are able to communicate with workloads in another compute node pool on a different network, networks in cloud computing system 150 are able to announce back to virtualized computing system 102, route preferences may be set up, etc.

Hybrid DMZ 210 also includes virtual appliance(s) (e.g., appliance 215) in an "aggregation layer" that process traffic flows. As used herein, a "virtual appliance" (or simply an "appliance") refers to a VM image with a pre-configured software application. The virtual appliances in hybrid DMZ 210 may include, e.g., third-party appliances that are inserted into hybrid DMZ 210 based on pre-defined templates. Each appliance may be a router or a transparent device. For example, appliance 215 may be a wide area network (WAN) optimizer appliance or an intrusion prevention appliance through which all traffic is forced, a firewall that is bounded such that traffic comes in on one network and leaves on another network, or the like. Traffic may terminate on the core of hybrid DMZ 210 or on the aggregation layer that is the core plus the (third-party) appliances.

In one embodiment, the template for inserting an appliance may take as input parameters such as whether the appliance is a transparent device (bump in the wire) or a router device (routed hop), among other things. Based on such input, the appliance may be deployed and additional transit network(s) may be created where the appliance is added, with the additional transit network(s) being connected to the hybrid network. For example, an appliance made by F5 Networks® of Seattle, Wash. may be identified as a router, and such a router appliance may be deployed and a new transit network that has its own numbered address space created, with network interface cards (NICs) inserted in the appropriate networks to enable routing.

Figure 3:
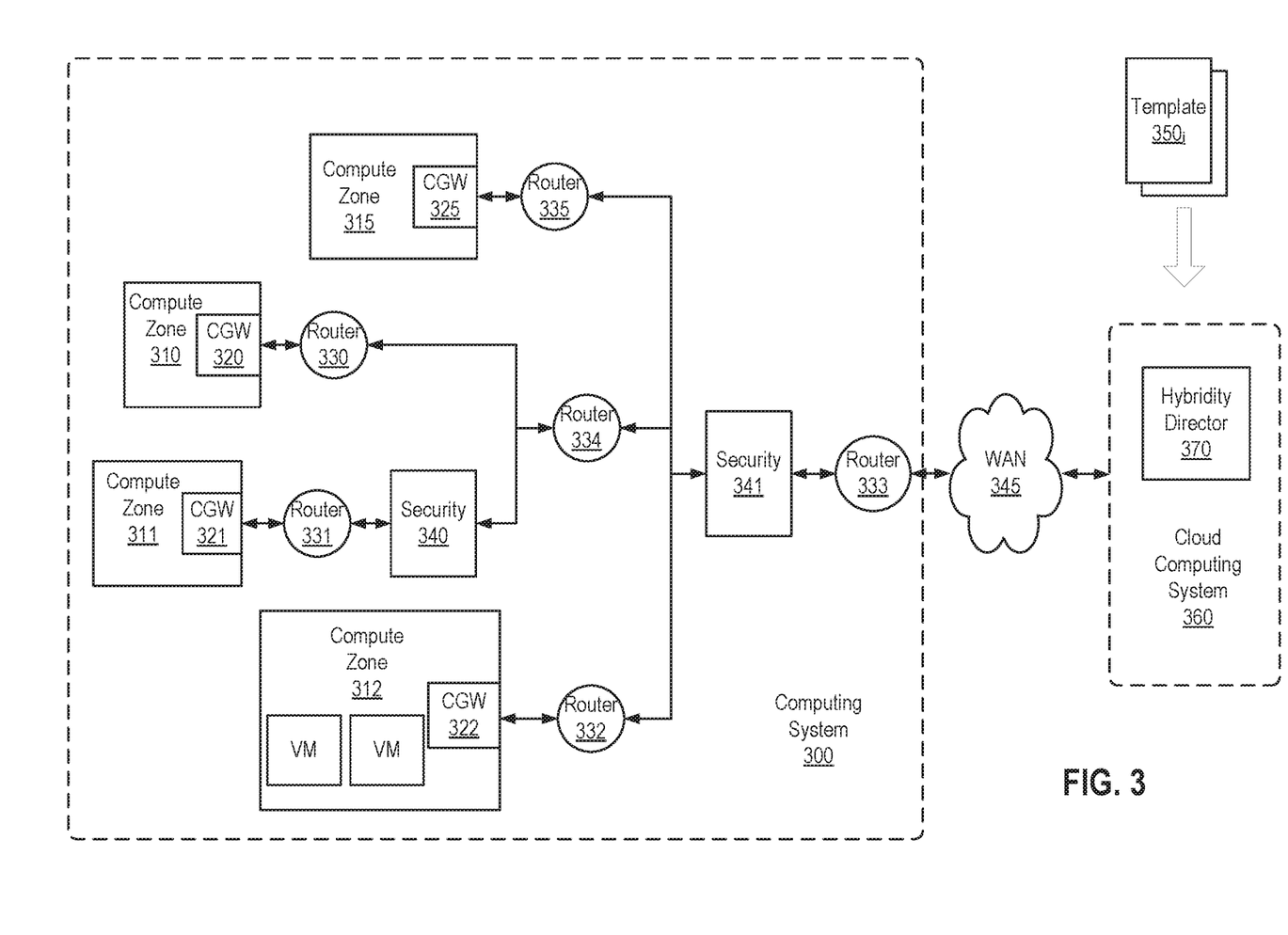
FIG. 3 illustrates an approach for learning and re-creating a datacenter landscape in a cloud computing system, according to an embodiment.

FIG. 3 illustrates an approach for learning and re-creating a datacenter landscape in a cloud computing system, according to an embodiment. For example, a datacenter landscape similar to that described above with respect to FIG. 2 may be learned from a datacenter and re-created in the cloud. As shown, computing system 300 includes routers 330-335, one of which is a WAN-facing router 333, multiple compute zones 310-313 that include respective cloud gateways 320-323, and security policies 340-341. It should be understood that the devices in computing system 300 may either be virtual devices or physical devices. Further, multi-tier topologies such as that shown in FIG. 3 are common, as enterprise datacenters typically have two or three tier topologies.

One embodiment permits datacenter landscapes such as the logical topology of virtualized computing system 300 to be learned and re-created in cloud computing system 360 as a topology similar to that of cloud computing system 150, described above with respect to FIG. 2. In such a case, gateways 320-323 are connected to corresponding gateways in cloud computing system 370. Gateways 320-323 then provide connectivity from their respective compute zones out to cloud computing system 370. Each of cloud gateways 320-323 determines, through probes sent out step-by-step to connect out to the WAN 345, how many hops exist between that cloud gateway and the WAN-facing node of virtualized computing system 300, namely WAN-facing router 333. For example, cloud gateway 322 may determine through probing that there is one hop between itself and router 333 by sending out probe packets and receiving responses back from router 332, and then from router 333. In some embodiments, gateways 320-323 may also determine the devices and/or zones in computing system 300 through probing. Further, gateways 320-323 may determine, for each zone, one or more of a security premise, disaster recovery operational model, backup operational model, and a compute operational model (oversubscribed/consolidation ratios etc.) that are defined virtually (e.g., by retrieving such information from a platform such as the network and security virtualization platform NSX®). Although described herein with respect to gateways such as gateways 320-323, it should be understood that other types of virtual (or physical) appliances which can perform similar functionalities are also contemplated.

Templates $350_i$ are pre-created structures, with user-tunable parameters, that specify particular virtual appliances, and templates $350_i$ can be used to bootstrap the creation and stitching in of those appliances. As used herein, user-tunable parameters are topology-specific definitions that may be different in cloud computing system 370 than in computing system 300. Users may modify the user-tunable parameters in such templates $350_i$, rather than manually downloading and deploying the virtual appliances themselves. In particular, templates $350_i$ may be used to specify devices that are required for security policies or application policies more generally. For example, WAN insertion templates may be used to specify security policies, such as whether there are load balancing requirements, WAN optimization policies, intrusion detection requirements, and the like. As described, security policies defined virtually and that gateways 320-323 have access to may simply be replicated to cloud computing system 370. Other security policies need to be manually defined via, e.g., templates. For example, a user may modify user-tunable parameters of a template to specify whether a corresponding virtual appliance being deployed is a routed hop or a bump in the wire. As another example, an intrusion detection system should be a bump on the wire rather than a routed hop, with traffic passing through the bump on the wire. Or, in the case of load balancing, users may specify a load balancer as a routed hop. That is, templates $350_i$ may permit users to specify a type of an appliance and whether the appliance is a bump on the wire or a routed hop.

As further examples of user-tunable parameters, users may specify how to prioritize WAN connectivity, e.g., based on speed or cost of different links, attributes of the links, etc. and hybridity director 370 will prioritize link affinity to the remote side based on the user specification. For example, a user may purchase two direct connect circuits and Internet bandwidth that are aggregated in a WAN-facing zone of a DMZ which has some routing device (E.g., NSX® by VMware, Inc.), and the user may specify that routing zone goes through a particular firewall. As another example, the user may tune preferences or weights to specify which of a number of links to prefer, or to specify use of a local connection rather than a remote connection. As yet another example, the user may specify whether he/she wishes to automatically distribute networks in compute zones out or not.

It should be understood that, after the datacenter landscape is learned, it may then be exported as a defined structure that may be used to replicate the same datacenter landscape elsewhere, such as in another cloud computing system.

Figure 4:
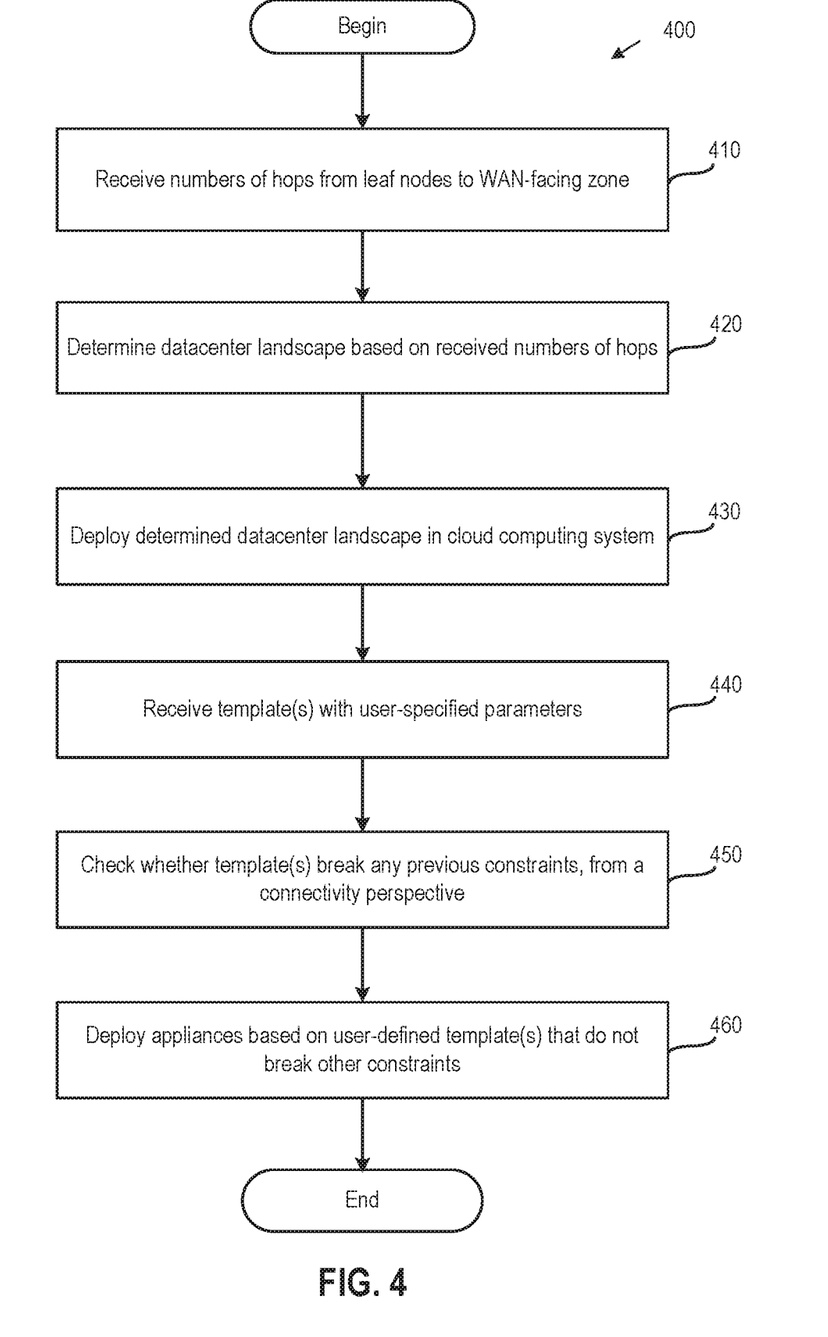
FIG. 4 illustrates a method for deploying a datacenter landscape in a cloud, according to an embodiment.

FIG. 4 illustrates a method for deploying a datacenter landscape in a cloud, according to an embodiment. As shown, method 400 begins at step 410, where hybridity director 370 receives, from hybrid cloud managers 320-325, numbers of hops from leaf nodes inside computing system 300 to a WAN-facing node in computing system 300, shown as router 333. In one embodiment, the numbers of hops may be determined by cloud gateways 320-323 (or other virtual appliances) that send out probe messages and receive responses back after connectivity via tunnels has been established to the cloud, as described above. In another embodiment, hybridity director 370 may also receive and use (e.g., detected) information relating to devices and/or zones in computing system 300, such as one or more of a per-zone security premise, disaster recovery operational model, backup operational model, and a compute operational model (oversubscribed/consolidation ratios etc.).

At step 420, hybridity director 370 determines the datacenter landscape based on the numbers of hops. In one embodiment, hybridity director 370 may combine the detected devices and numbers of hops received from cloud gateways 320-325 into a tree representing a logical topology of virtualized computing system 300.

In another embodiment, hybridity director 370 may also determine the datacenter landscape based on user inputs. For example, the user may override certain detected devices in the logical topology through a user interface wizard or application programming interface (API) workflow. The user may also add devices, security policies, etc. to the determined datacenter landscape. For example, the user may specify an additional internal transit zones, isolated zones, external connectivity zones, and the like. In addition, some things defined physically such as air gap security for a compute zone cannot be automatically detected or replicated in the cloud and may require user specification. Further, the user may specify policies per zone such as: security premise, disaster recovery operational model, backup operational model, compute operational model (oversubscribed/consolidation ratios etc.). Such per zone policies may also be auto-detected (e.g., via probing) and then supplemented by the user and created in templated landing zones.

At step 430, hybridity director 370 deploys the determined datacenter landscape in the cloud computing system. In one embodiment, hybridity director 370 creates the same zones in the cloud, with the same number of hops to a WAN facing zone. As described, leaf zones may each be routed through multiple hops to reach a WAN facing node. Hybridity director 370 may try to replicate leaf zones in computing system 300 to equivalent leaf in cloud computing system 360. In particular, hybridity director 370 may coordinate with other hardware and/or software (e.g., physical routers and switches, hypervisor software, and network virtualization software) to automatically create networks and compute zones, set up routing protocols so that there is reachability between components, wire in devices such as routers in the topology, and the like. It should be understood that some of the routers that are deployed may mimic the tiers of topologies that are in computing system 300. In one embodiment, hybridity director 370 may start at a WAN facing edge in cloud computing system 370 and then replicate tiers of networks behind the WAN facing edge in cloud.

At step 440, hybridity director 370 receives template(s) with user-specified parameters. As described, template(s) may be used to specify particular virtual appliances to be deployed according to a user's specified parameters, such as whether a device is a routed hop or bump on the wire. If virtual zoning is used in virtualized data center 300, those may be automatically built. But it should be understood that actual zoning and connectivity between zones is automatically learned and deployed.

At step 450, hybridity director 370 checks if the template (s) break any previous constraints, from a connectivity perspective, of the datacenter landscape that was determined and deployed at step 430. That is, hybridity director 370 checks to ensure that the previous connectivity model is not broken, and if such is the case, then security, load balancing, or other policy specified by the template(s) may be applied. This automatic constraint checking can replace manual trial and error that may otherwise be required. For example, hybridity director 370 may have a holistic view of cloud computing system 150 and be able to determine, e.g., how many hops are between links in the cloud, which can replace manual guessing as to the number of hops.

At step 460, hybridity director 370 deploys appliances based on the user-defined template(s) that do not break other constraints.

Advantageously, techniques disclosed herein learn datacenter landscapes so that topologies can be replicated in the cloud. As a result, users may not need to change, from a component and operational perspective, what they are using in, e.g., their enterprise datacenters.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method of recreating a datacenter landscape in a cloud computing system, comprising:
    receiving, from each leaf node of a plurality of leaf nodes in a virtualized computing system, a detected number of hops from the leaf node to a wide area network (WAN) facing node in the virtualized computing system;
    determining the datacenter landscape based on at least the received number of hops from each of the leaf nodes;
    deploying the determined datacenter landscape in the cloud computing system;
    receiving one or more virtual appliance deployment templates with user-specified parameters; and
    for each template of the one or more virtual appliance deployment templates:
        determining whether the template breaks any constraints from a connectivity perspective of the determined datacenter landscape, and
        when the template does not break any of the constraints, deploying one or more virtual appliances based on the template.

2. The method of claim 1, wherein the user-specified parameters in each of the one or more templates include at least one of a security premise, a disaster recovery operational model, a backup operational model, a compute operational model, a prioritization of WAN connectivity links, and whether an associated virtual appliance is a transparent device or a router device.

3. The method of claim 1, wherein the number of hops from each of the leaf nodes to the WAN facing node is determined using one or more probes.

4. The method of claim 1, further comprising, determining at least one of a security premise, a disaster recovery operational model, a backup operational model, and a compute operational model that has been defined for one or more of the plurality of nodes.

5. The method of claim 1, wherein:
    each of the leaf nodes is a virtual appliance in a respective compute zone in the virtualized computing system; and
    the WAN facing node is a router.

6. The method of claim 5, wherein each of the leaf nodes is a gateway virtual appliance.

7. The method of claim 1, further comprising, deploying the determined datacenter landscape in another cloud computing system based on at least an exported representation of the determined datacenter landscape.

8. The method of claim 1, wherein deploying the determined datacenter landscape in the cloud computing system includes at least one of creating one or more compute zones, creating one or more networks, setting up routing protocols, and wiring in devices.

9. A non-transitory computer-readable medium comprising instructions executable by one or more computers, wherein the instructions, when executed, cause the one or more computers to perform operations for recreating a datacenter landscape in a cloud computing system, the operations comprising:
    receiving, from each leaf node of a plurality of leaf nodes in a virtualized computing system, a detected number of hops from the leaf node to a wide area network (WAN) facing node in the virtualized computing system;
    determining the datacenter landscape based on at least the received number of hops from each of the leaf nodes;
    deploying the determined datacenter landscape in the cloud computing system,
    receiving one or more virtual appliance deployment templates with user-specified parameters; and
    for each template of the one or more virtual appliance deployment templates:
        determining whether the template breaks any constraints from a connectivity perspective of the determined datacenter landscape, and
        when the template does not break any of the constraints, deploying one or more virtual appliances based on the template.

10. The computer-readable medium of claim 9, wherein the user-specified parameters in each of the one or more templates include at least one of a security premise, a disaster recovery operational model, a backup operational model, a compute operational model, a prioritization of WAN connectivity links, and whether an associated virtual appliance is a transparent device or a router device.

11. The computer-readable medium of claim 9, wherein the number of hops from each of the leaf nodes to the WAN facing node is determined using one or more probes.

12. The computer-readable medium of claim 9, the operations further comprising, determining at least one of a security premise, a disaster recovery operational model, a backup operational model, and a compute operational model that has been defined for one or more of the plurality of nodes.

13. The computer-readable medium of claim 9, wherein:
each of the leaf nodes is a virtual appliance in a respective compute zone in the virtualized computing system; and
the WAN facing node is a router.

14. The computer-readable medium of claim 13, wherein each of the leaf nodes is a gateway virtual appliance.

15. The computer-readable medium of claim 9, the operations further comprising, deploying the determined datacenter landscape in another cloud computing system based on at least an exported representation of the determined datacenter landscape.

16. The computer-readable medium of claim 9, wherein deploying the determined datacenter landscape in the cloud computing system includes at least one of creating one or more compute zones, creating one or more networks, setting up routing protocols, and wiring in devices.

17. A system, comprising:
a processor; and
a memory, wherein the memory includes a program for avoiding congestion and high latency in a network, the program being configured to perform operations for recreating a datacenter landscape in a cloud computing system, the operations comprising:
receiving, from each leaf node of a plurality of leaf nodes in a virtualized computing system, a detected number of hops from the leaf node to a wide area network (WAN) facing node in the virtualized computing system,
determining the datacenter landscape based on at least the received number of hops from each of the leaf nodes,
causing the determined datacenter landscape to be deployed in the cloud computing system,
receiving one or more virtual appliance deployment templates with user-specified parameters; and
for each template of the one or more virtual appliance deployment templates:
determining whether the template breaks any constraints from a connectivity perspective of the determined datacenter landscape, and
when the template does not break any of the constraints, deploying one or more virtual appliances based on the template.

* * * * *